(12) United States Patent
Ammar et al.

(10) Patent No.: US 9,791,593 B2
(45) Date of Patent: Oct. 17, 2017

(54) MATTER-WAVE GRAVIMETER WITH MICROWAVE SEPARATION AT THE MAGIC FIELD

(71) Applicant: THALES, Courbevoie (FR)

(72) Inventors: Mahdi Ammar, Paris (FR); Sylvain Schwartz, St Remy les Chevreuse (FR); Landry Huet, Versailles (FR)

(73) Assignee: Thales, Courbevoie (FR)

( * ) Notice: Subject to any disclaimer, the term of this patent is extended or adjusted under 35 U.S.C. 154(b) by 321 days.

(21) Appl. No.: 14/704,556

(22) Filed: May 5, 2015

(65) Prior Publication Data
US 2015/0331142 A1    Nov. 19, 2015

(30) Foreign Application Priority Data

May 16, 2014    (FR) ...................................... 14 01106

(51) Int. Cl.
*G01V 7/02*    (2006.01)
*G01V 7/00*    (2006.01)

(52) U.S. Cl.
CPC . *G01V 7/02* (2013.01); *G01V 7/00* (2013.01)

(58) Field of Classification Search
CPC ....................................................... G01V 7/02
USPC ....................................................... 250/251
See application file for complete search history.

(56) References Cited

U.S. PATENT DOCUMENTS

2015/0200028 A1*    7/2015   Folman ................. G21K 1/006
                                                       250/251

FOREIGN PATENT DOCUMENTS

FR    2968088 A1    6/2012

OTHER PUBLICATIONS

Search Report issued in French application No. 1401106, dated Jan. 13, 2015 (11 pages).
Harber, D.M. et al., Effect of cold collisions on spin coherence and resonance shifts in a magnetically trapped ultracold gas, The American Physical Society, vol. 66, No. 5, dated Nov. 1, 2002 (6 pages).

(Continued)

*Primary Examiner* — Jason McCormack
(74) *Attorney, Agent, or Firm* — Davis Wright Tremaine LLP; Michael J. Donohue

(57) ABSTRACT

The general field of the invention is that of matter-wave gravimeters. The gravimeter according to the invention comprises at least:
- means for generating, for capturing and for cooling a cloud of ultra-cold atoms;
- means of transferring the atoms into a superposition, with equal weights, of a first internal electronic state called state |1>) and of a second internal electronic state called state |2> comprising the application of at least a first microwave field and of a radiofrequency field;
- means for separating the atoms into two wave packets for a given period of time under the effect of at least a second microwave field, the said separation leading to a phase-shift associated with the local gravitational field;
- calibration means allowing a "magic" magnetostatic field to be determined for which the difference in energy between the first internal electronic state and the second internal electronic state is independent, to a first order, of the fluctuations of the magnetostatic field.

9 Claims, 4 Drawing Sheets

(56) References Cited

OTHER PUBLICATIONS

Treutlein, Philipp, Coherent manipulation of ultracold atoms on atom chips, Dissertation submitted to the Faculty of Physics of the Ludwig-Maximilians-Universität München, dated Feb. 22, 2008 (227 pages).
Treutlein, Philipp et al., Coherence in Microchip Traps, Physical Review Letters, vol. 92, No. 20, dated May 21, 2004 (4 pages).
Huet, Landry, "Gravimétrie atomique sur puce et applications embarquées," dated Jan. 11, 2013 (233 pages).

* cited by examiner

MATTER-WAVE GRAVIMETER WITH MICROWAVE SEPARATION AT THE MAGIC FIELD

BACKGROUND TO THE INVENTION

1. Technical Field of the Invention

The field of the invention is that of gravimeters using matter waves which allow gravity measurements to be obtained with a very high precision. The applications cover very broad technical fields going from oil prospection to navigation by terrain correlation.

2. Description of the Prior Art

Generally speaking, gravimeters based on matter waves use atoms in free fall separated by laser pulses of the "Raman" type.

Another possibility for gravimeters using matter waves consists in using atoms pre-cooled by laser to a very low temperature close to zero degrees Kelvin and trapped in the neighbourhood of a substrate or "atomic chip" throughout the detection cycle. An architecture of this type notably has the advantages of being very compact and of a reduced power consumption.

The principle of operation of this latter type of gravimeter consists in trapping the cold atoms in the neighbourhood of the chip by means of a magnetic field in a superposition of two internal states by means of a two-photon transition, also referred to as "π/2 pulse", and in separating them into two separate packets of atomic waves by applying a microwave field which creates a different potential for the two internal states. The measurement axis coincides with the separation axis. This axis corresponds to the vertical axis in the case of a measurement of the local gravitational field g. Such a device is described in the Patent application FR 2 968 088 by the applicant and is entitled "Method and device for measurement of a local gravitation field, using matter waves integrated onto an atomic chip with microwave separation of the atoms".

The phase-shift $\Delta\Phi_g$ induced by the local gravitation field g is written:

$$\Delta\Phi_g = \frac{MsT_s}{\hbar} g = Kg \qquad \text{(Equation 1)}$$

s being the separation distance between the two wave packets,

M being the mass of the atoms used, $T_s$ being the time during which the two wave packets are kept separated, and $\hbar$ the reduced Planck's constant.

The uncertainty in the measurement of g according to this principle notably depends on the uncertainty in the scale factor K. The stability of the latter is limited in particular by the stability of the distance s between the two wave packets during the measurement. Indeed, any fluctuation of the static DC or microwave MW magnetic field induces fluctuations of the distance s. The fluctuations in the magnetic fields are mainly due to the fluctuations in the current sources $I_{DC}$ and $I_{MW}$ flowing in the chip. With the current techniques, the latter can only be stabilized with difficulty to better than $10^{-5}$ in relative value.

The Patent application FR 2 968 088 describes a method allowing the influence of the fluctuations in the MW magnetic field over the distance s to be reduced to the order 2.

Another important point relates to the coherence time of the interferometer, which may be reduced under the effect of the involuntary fluctuations in the magnetostatic field. The technique generally used to render the system robust to these fluctuations consists in using a particular magnetic field and two internal states of the atoms of rubidium $^{87}$Rb, sometimes called "clock states" and which are as follows:

|1>=|F=1, $m_F$=−1> and,
|2>=|F=2, $m_F$=1>

The magnetostatic field is centred on the point $B_0$ approximately equal to 3.229 Gauss. In this configuration, the fluctuations of the DC magnetic field only act at the second order on the difference in energy between the two internal states in question. For this reason, this point of operation is sometimes referred to as "magic field".

However, the effect of the application of the DC and MW magnetic fields simultaneously modifies the "magic field" condition, and to a greater extent the greater the MW field.

SUMMARY OF THE INVENTION

In order to solve this problem, the device according to the invention is a novel gravimeter operating with clock states referred to as "contaminated states", in which the magnetostatic field is adjusted in such a manner as to take into account the presence of separation microwave fields.

More precisely, the subject of the invention is a matter-wave gravimeter enabling the measurement of a local gravitational field, the said gravimeter comprising at least:

one electronic chip comprising a measurement axis;

means for generating, for capturing and for cooling a cloud of ultra-cold atoms comprising a magnetostatic trap generating a magnetostatic field allowing the cloud of ultra-cold atoms to be trapped at a predetermined distance from the said measurement plane;

means of transferring the atoms into a superposition with equal weights of a first internal electronic state called state |1> and of a second internal electronic state called state |2>, driving each atom into the resultant state (|1>+|2>)/√2, the said means comprising the application of at least a first microwave field and of a radiofrequency field;

means for separating the atoms into two wave packets for a given period of time under the effect of at least a second microwave field, the said separation leading to a phase-shift linked to the local gravitational field;

characterized in that the gravimeter comprises calibration means allowing a "magic" magnetostatic field to be determined for which the difference in energy between the first internal electronic state and the second internal electronic state is independent, to a first order, of the fluctuations of the magnetostatic field, the calibration means comprising first means allowing the magnetostatic field to be made to oscillate around predetermined values in the presence of the second microwave field and second means for measuring the variations of the difference in energy between the first internal electronic state and the second internal electronic state, the magic field corresponding to the minimum variation of the difference in energy.

Advantageously, the electronic chip comprises at least a first central conducting wire and two lateral waveguides disposed symmetrically on either side of the first conducting wire, the cloud of atoms being situated, prior to separation, above the first conducting wire, the said first conducting wire having a first current flowing through it and generating a magnetostatic field, the first waveguide having a second current flowing through it which is modulated at a second microwave frequency generating a second microwave field and the second waveguide having a third current flowing through it which is modulated at a third microwave frequency, thus generating a third microwave field.

Advantageously, the gravimeter comprises:
means for spatial recombination of the atoms following the separation phase;
means of converting the phase-shift into a difference of population between the two internal states, the said means comprising the application of a microwave field and of a radiofrequency field;
means for measuring the phase-shift by means of the measurement of the populations of the two internal states used;
means for calculating the said local gravitational field using the knowledge of the said phase-shift.

Advantageously, the atoms are rubidium 87 and the first internal electronic state and the second internal electronic state correspond to the two hyperfine levels of rubidium 87 which are usually denoted $\{F=2, m_F=+1\}$ and $\{F=1, m_F=-1\}$ also known as "clock states".

Advantageously, the magic magnetostatic field is in the range between 3.23 Gauss and 3.55 Gauss, the said magic magnetostatic field crossing in a constant manner with the microwave power of the second microwave field and/or of the third microwave field.

Advantageously, the level $\{F=1, m_F=-1\}$ being coupled to the level $\{F=2, m_F=-1\}$ by the second microwave frequency $\omega_1$, the level thus obtained being referred to as first cross-coupled level $|a\rangle$, with this first coupling is associated a first Rabi frequency $\Omega_1$, proportional to the modulus of the microwave field at the second microwave frequency $\omega_1$; the level $\{F=2, m_F=+1\}$ being coupled to the level $\{F=1, m_F=+1\}$ by the third microwave frequency $\omega_2$, the level thus obtained being referred to as second cross-coupled level $|b\rangle$, with this second coupling is associated a second Rabi frequency $\Omega_2$, proportional to the modulus of the microwave field at the third microwave frequency $\omega_2$, the first Rabi frequency being equal to the second Rabi frequency.

Advantageously, the separation distance of the atoms into two wave packets is substantially equal to 20 microns.

Advantageously, the means for generating, for capturing and for cooling the cloud of ultra-cold atoms prior to its transfer into the magnetic trap in the neighbourhood of the chip comprise a vacuum vessel and an assembly of six laser beams combined with a magnetic field gradient generated by coils external to the said vessel, the whole assembly being called a "magneto-optical trap".

BRIEF DESCRIPTION OF THE DRAWINGS

The invention will be better understood and other advantages will become apparent upon reading the description that follows presented by way of non-limiting example and by virtue of the appended figures, amongst which.

DETAILED DESCRIPTION OF THE INVENTION

Figure 1:
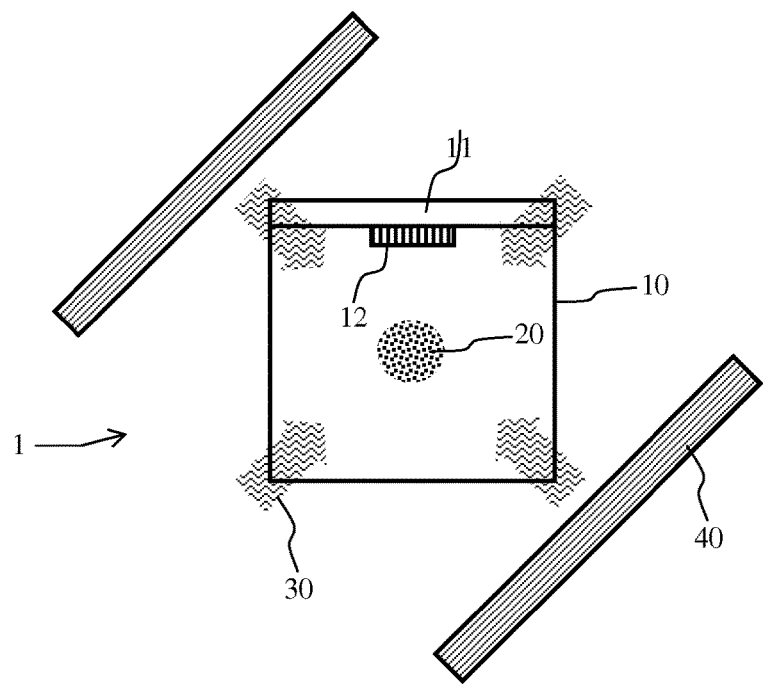
FIG. 1 shows a gravimeter according to the invention during the phase for cooling the ultra-cold atoms.

The architecture of a gravimeter 1 according to the invention is shown on the face view in FIG. 1. The central part is composed of a vacuum vessel 10 all the walls of which are transparent, with the possible exception of the top side 11 which is composed of a chip 12 onto which conducting wires have been deposited.

The atoms 20, initially in the gaseous phase at the ambient temperature in the cell, are trapped and cooled by means of six laser beams 30 disposed symmetrically two by two on three perpendicular axes in pairs combined with a magnetic field gradient generated by external magnetic coils 40. The six laser beams are disposed symmetrically on three perpendicular axes. In FIG. 1, which is a cross-sectional view, only four of the six laser beams are shown represented by arrows, the two missing beams are perpendicular to the plane of the sheet. The assembly of the laser beams and of the magnetic coils is called a three-dimensional magneto-optical trap or "3D MOT".

A the end of the cooling and trapping phase, the atoms are transferred into a purely magnetic conservative trap created in the neighbourhood of the wires of the chip 12 and prepared in an internal state, for example $|1\rangle$. A the end of this phase, the atoms are situated at an initial spatial position h above the electronic chip 12.

Figure 2:
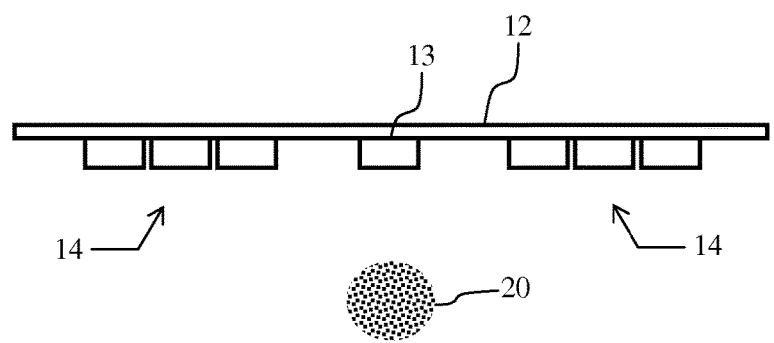
FIGS. 2, 3 and 4 show the development of the atomic cloud during the phases for creation of the atomic cloud, of superposition of the atomic states and of spatial separation of the said atomic states.

As can be seen in FIG. 2, the electronic chip 12 comprises at least a first central conducting wire 13 and two lateral waveguides 14 disposed symmetrically on either side of the first conducting wire, the cloud of atoms 20 being situated above the first conducting wire 13, the said first conducting wire having a first current flowing through it and generating a magnetostatic field, the first waveguide having a second current flowing through it modulated at a second microwave frequency generating a second microwave field and the second waveguide having a third current flowing through it modulated at a third microwave frequency, generating a third microwave field. This disposition allows the atomic cloud to be separated and recombined magnetically. The method of separation-recombination is detailed hereinbelow.

Figure 3:
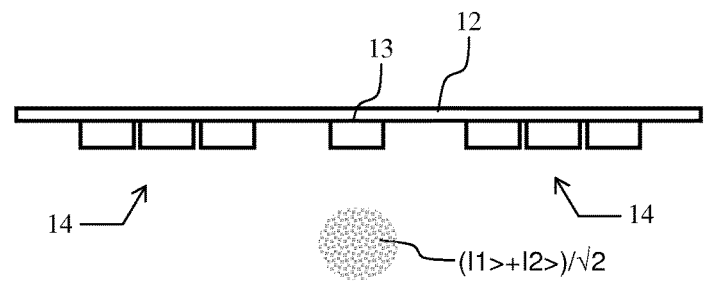

In a first step illustrated in FIG. 3, the atoms are transferred into a superposition, with equal weights, of the internal states $|1\rangle$ and $|2\rangle$, by a pulse of short duration, referred to as π/2 pulse, combining a microwave field and a radiofrequency field generated, for example, by the conducting lines of the chip 12. Each atom is then in a resultant intermediate state denoted $(|1\rangle+|2\rangle)/\sqrt{2}$.

Figure 4:
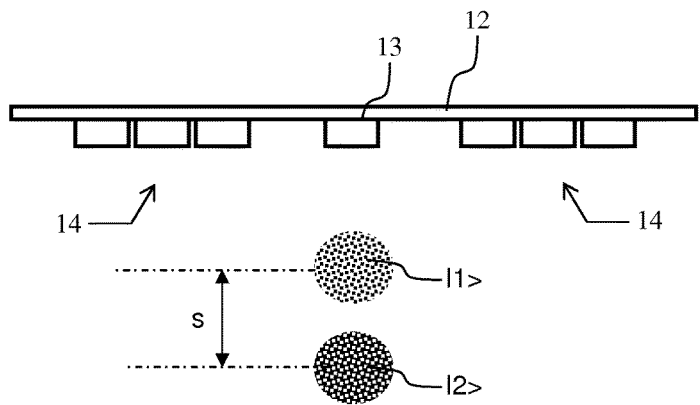

In a second step illustrated in FIG. 4, the atoms are separated into two wave packets associated with the internal states $|1\rangle$ and $|2\rangle$, by virtue of a microwave potential MW depending on the internal state. The microwave field used for the separation is generated by the two coplanar waveguides or CPW 14. The separation is for example in the vertical direction so as to be the as sensitive as possible to the local gravitational field. The separation distance s of the atoms is of the order of one or of several tens of micrometers. The separation for a time $T_s$ leads to a phase-shift between the two wave packets associated with the local gravitational field.

In a third step, the atoms are recombined by the elimination of the applied microwave fields. The phase-shift is subsequently converted into a difference of population between the internal states by means of a second "π/2" pulse.

Figure 5:
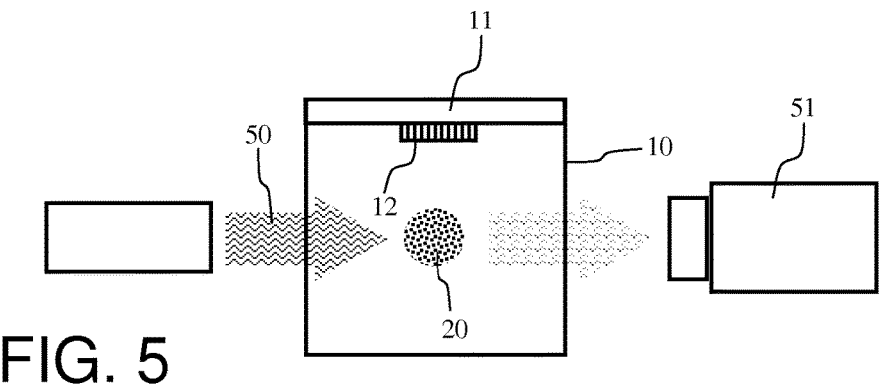
FIG. 5 shows a gravimeter according to the invention during the measurement phase.

Finally, as shown in FIG. 5, the atomic cloud is detected by using the technique of imaging by absorption which consists in measuring by means of a CCD camera 51 the absorption of a quasi-resonant laser beam 50 by the atomic cloud. Access is thus gained, by optical spectroscopy, to the populations of the two internal states hence to the phase-shift sought. Lastly, the local gravitational field g is calculated.

The magnetic trapping of the neutral atoms is based on the interaction of the magnetic moment p, of a particle with an external magnetic field B(r). The potential energy of the particle is: $E_B = -\mu \cdot B$, and the magnetic moment μ is in rapid precession around B at the Larmor frequency. In a conventional approach, μ may have any given orientation with respect to B(r). In quantum mechanics, the projection of μ onto B(r) can take a set of discrete values given by the quantum number $m_F$. The potential energy of the atoms in a field B(r), in the limit of low magnetic fields, is then written:

$$E_{F,m_F} = \mu_B g_F m_F |B(r)|,$$

with $\mu_B$ the Bohr magneton and,
$g_F$ the Landé factor corresponding to the angular momentum F.

Figure 6:
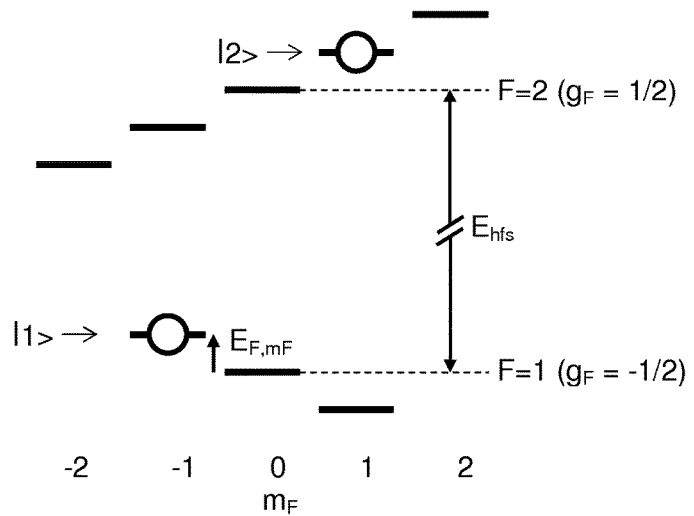
FIG. 6 is a simplified representation of the hyperfine levels of rubidium 87.

Since the Maxwell's equations prohibit the existence of a local maximum of magnetic field in vacuum or in a region with no source, only the atoms verifying that the product $m_F g_F$ is positive may be trapped by a magnetostatic field. FIG. 6 is a simplified representation of the hyperfine levels |F, m> of the fundamental level $5^2S_{1/2}$ of rubidium 87. The clock states |1> and |2> are indicated by circles.

The model described hereinabove indicating a linear variation of the potential energy $E_B$ as a function of the magnetic field B=|B| is only valid to the first order if $\mu_B B/E_{hfs} \ll 1$. A more complete description of the energy levels of the hyperfine states $(5^2S_{1/2})$ of $^{87}$Rb is given by the of Breit-Rabi formula (Equation 2) hereinbelow. The parameters $g_J$ and $g_I$ are the Landé factors respectively corresponding to the nuclear and electron angular momenta.

$$\begin{cases} E_{F=1,m_F} = E_{hfs}\left(-\frac{1}{8} + \frac{g_I m_F}{g_J - g_I}\zeta - \frac{1}{2}\sqrt{1 + m_F \zeta + \zeta^2}\right) \\ E_{F=2,m_F} = E_{hfs}\left(-\frac{1}{8} + \frac{g_I m_F}{g_J - g_I}\zeta + \frac{1}{2}\sqrt{1 + m_F \zeta + \zeta^2}\right) \\ \zeta = \frac{\mu_B(g_J - g_I)B}{E_{hfs}} \end{cases}$$ (Equations 2)

Figure 7:
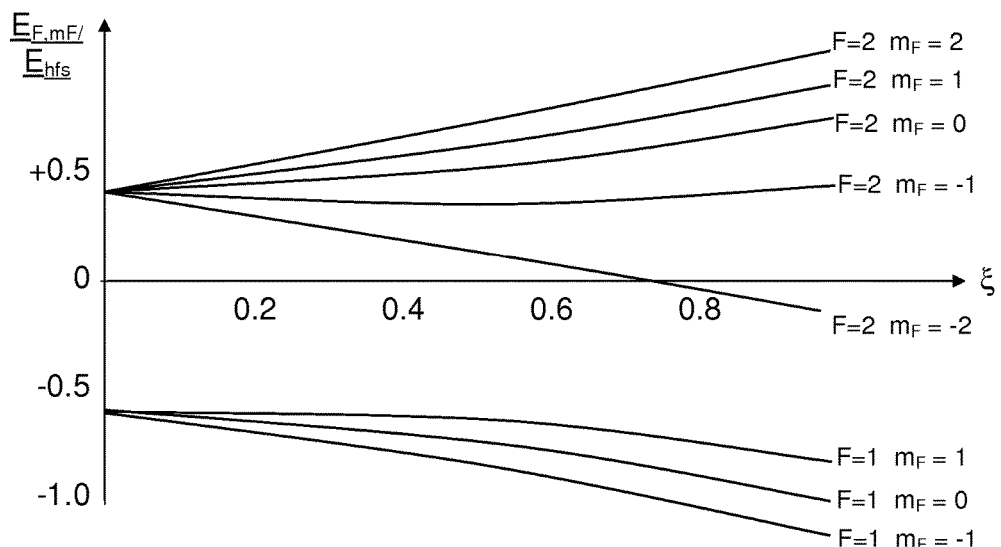
FIG. 7 shows, in the absence of a microwave field, the variation of the clock states $|1\rangle$ and $|2\rangle$ as a function of the magnetostatic field.

These energies are shown in FIG. 7 as a function of the parameter ζ linearly dependant on the magnetic field B. In this FIG. 7, the energies are re-dimensioned with respect to the energy $E_{hfs}$.

For typical fields of a few Gauss, it is demonstrated that:

$$\zeta = \frac{\mu_B(g_J - g_I)}{E_{hfs}} \approx 10^{-3}.$$

It is therefore legitimate to carry out a limited development of the roots in ξ in the equations 2, which gives, to the second order:

$$\sqrt{1 + \xi + \xi^2} \approx 1 + \frac{1}{2}\xi + \frac{3}{8}\xi^2$$

and $$\sqrt{1 - \xi + \xi^2} \approx 1 - \frac{1}{2}\xi + \frac{3}{8}\xi^2$$

The difference in energy between the levels {F=2, $m_F$=+1} and {F=1, $m_F$=−1} is therefore written:

$$\Delta E = 2\mu_B g_I B + E_{hfs} + \frac{3E_{hfs}}{8}\xi^2 = 2\mu_B g_I B + E_{hfs} + \frac{3\mu_B^2(g_J - g_I)^2}{8E_{hfs}}B^2$$

Figure 8:
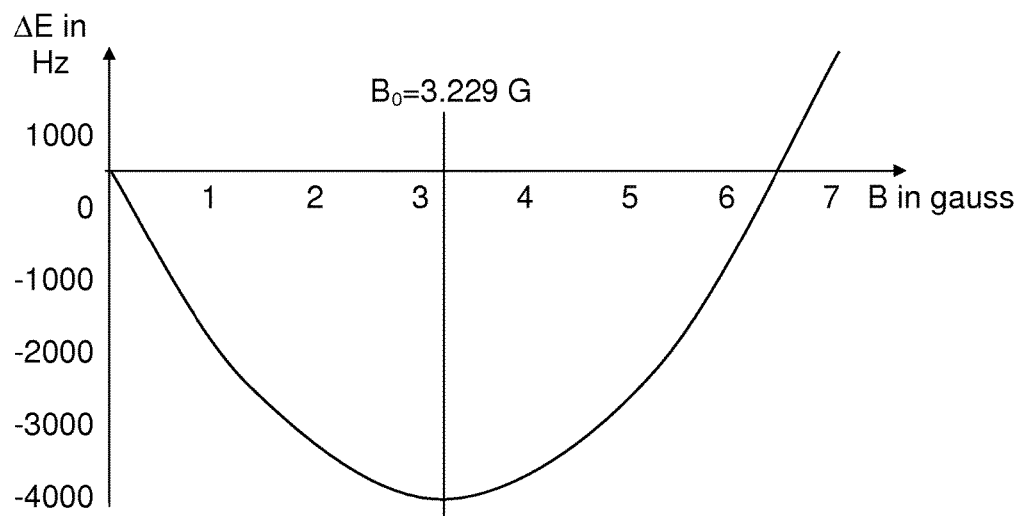
FIG. 8 shows, in the absence of a microwave field, the variation of the difference in energy between the clock states $|1\rangle$ and $|2\rangle$ as a function of the magnetostatic field.

This difference in energy ΔE between the clock states |1> and |2> is shown as a function of the magnetic field B in FIG. 8. The expression is seen to take the form of a parabolic arc.

This expression reaches a minimum when its derivative with respect to B is zero. This minimum is equal to:

$$B_0 = \frac{-8\mu_B g_I E_{hfs}}{3\mu_B^2(g_J - g_I)^2} \approx 3.229 \text{ Gauss}$$

When the magnetostatic field has this value of 3.229 G, the variation of ΔE as a function of B becomes zero to the first order. Experimentally, this "magic" point is very advantageous since it allows the fluctuations of the DC magnetic field to be avoided, which potentially increases the coherence time by several orders of magnitude, as demonstrated in the literature.

In the presence of the DC field at the magic point, the MW field allows the state |1> to be coupled with other internal states of $^{87}$Rb, which allows the potential of the atoms in the state |1> to be spatially modified and allows them to be spatially separated from atoms in the state |2>. Reference will be made to the article P. Böhi et al., Nature Physics 5, 592-597 (2009) on this point. The internal states |1> and |2> and the associated energies are modified under the effect of the couplings induced by the MW fields. This is sometimes referred to in the literature as "contamination" of the states |1> and |2> by other internal states. One of the effects of this contamination is to modify the magic field condition described previously.

The object of the invention is to determine a new magic field in the presence of microwave fields so as to conserve the independence from the fluctuations of the DC magnetic field, characteristic of the magic field.

The principle for implementing an atomic interferometer according to the invention is to modify the energies of the two levels used by coupling them to two other hyperfine levels by virtue of two microwave frequencies. More precisely, the level {F=2, $m_F$=+1} will be coupled to the level {F=1, $m_F$=+1} by the microwave frequency $\omega_2$, and the level {F=1, $m_F$=−1} will be coupled to the level {F=2, $m_F$=−1} by the microwave frequency $\omega_1$, with the energy levels known as Breit-Rabi levels depending on where the origin of the energies is taken half way between the levels {F=1, $m_F$=0} and {F=2, $m_F$=0}):

Energy of the level $\{F=2, m_F=+1\}$:

$$E_{F=2,mF=+1} = \mu_B g_I B + \frac{E}{2}\sqrt{1+\xi+\xi^2}$$

Energy of the level $\{F=1, m_F=+1\}$:

$$E_{F=1,mF=+1} = \mu_B g_I B - \frac{E}{2}\sqrt{1+\xi+\xi^2}$$

Energy of the level $\{F=1, m_F=-1\}$:

$$E_{F=1,mF=-1} = -\mu_B g_I B - \frac{E}{2}\sqrt{1-\xi+\xi^2}$$

Energy of the level $\{F=2, m_F=-1\}$:

$$E_{F=2,mF=-1} = -\mu_B g_I B + \frac{E}{2}\sqrt{1-\xi+\xi^2}$$

The level coming from the coupling between $\{F=2, m_F=+1\}$ and $\{F=1, m_F=+1\}$ by the microwave frequency $\omega_2$ is denoted as "cross-coupled" level $|b\rangle$. It is assumed that, at the start of the interferometric sequence, the microwave power is zero and that $|a\rangle$ is then in the state $\{F=2, m_F=+1\}$. $\delta_2=\pm 1$ denotes the sign of the de-tuning between the frequency $\omega_2$ and the energy of the atomic transition from the level $\{F=2, m_F=+1\}$ to the level $\{F=1, m_F=+1\}$ at the start of the interferometric sequence. Typically, the value of the constant magnetic field is then equal to the magic field without microwave previously calculated, being around 3.23 G. Under the hypothesis of adiabatic development of the cross-coupled state, that is assumed to be verified in the framework of the invention, the energy of the state $|b\rangle$ is then:

$$E_{|b\rangle} = \mu_B g_I B - \delta_2 \frac{\hbar}{2}\sqrt{\Omega_2^2 + \left[\omega_2 - \frac{E_{hfs}}{\hbar}\left(1+\frac{\xi}{2}+\frac{3}{8}\xi^2\right)\right]^2}$$

where $\Omega_2$ is the Rabi frequency, proportional to the modulus of the microwave field at the frequency $\omega_2$.

Similarly, the energy of the "cross-coupled" level $|a\rangle$, coming from the coupling between $\{F=1, m_F=-1\}$ and $\{F=2, m_F=-1\}$ by the microwave frequency $\omega_1$ is given by:

$$E_{|a\rangle} = -\mu_B g_I B + \delta_1 \frac{\hbar}{2}\sqrt{\Omega_1^2 + \left[\omega_1 - \frac{E_{hfs}}{\hbar}\left(1-\frac{\xi}{2}+\frac{3}{8}\xi^2\right)\right]^2}$$

where it has been assumed that, at the start of the interferometric sequence, $|b\rangle$ is in the state $\{F=1, m_F=-1\}$ and the frequency $\omega_1$ is out of tune with the energy of the atomic transition $\{F=1, m_F=-1\}$ to $\{F=2, m_F=-1\}$ whose sign is given by $\delta_1=\pm 1$. The assumption of adiabatic development is also made, and $\Omega_1$ is defined as the Rabi frequency, proportional to the modulus of the microwave field at the frequency $\omega_1$.

In the framework of the gravimeter according to the invention, the signs of $\delta_1$ and $\delta_2$ are necessarily opposite, in order to create microwave potentials of the same nature for the two cross-coupled levels, either attractive or repulsive.

The method according to the invention consists therefore in choosing a value of magnetic field $B_m$ such that the curve $E_{|b\rangle}(B)-E_{|a\rangle}(B)$ goes through a minimum at this point. The magnetic field fluctuations then have no effect to a first order on this difference in energy.

Figure 9:
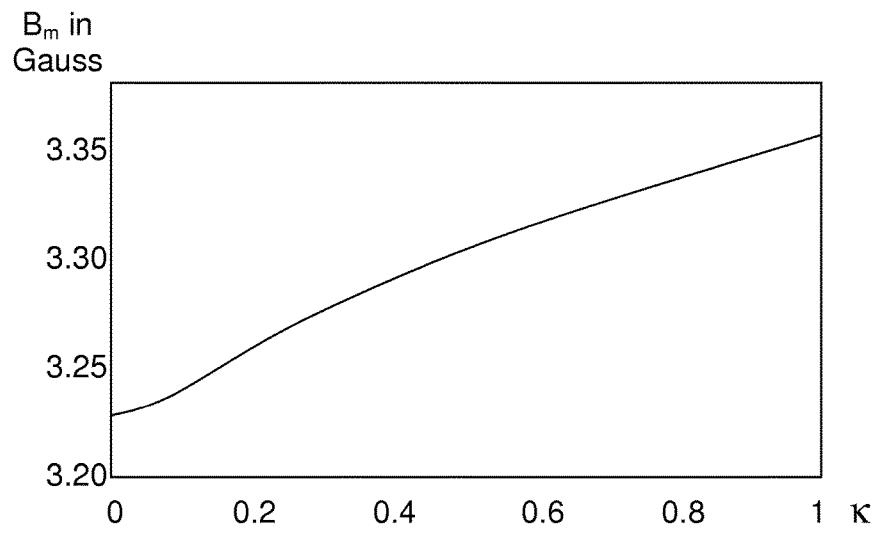
FIG. 9 shows the variation of the magnetic magic field as a function of the normalized microwave power for a set of parameters detailed hereinafter.

By way of example, FIG. 9 shows the variation of the magic field B as a function of the parameter κ representative of the normalized microwave power. More precisely, these curves have been obtained for the following parameters:

$$\delta_1 = -\delta_2 = +1$$

$$\hbar\omega_1 = E_{F=2,mF=-1}(B_0) - E_{F=1,mF=-1}(B_0) + \hbar\Delta_1$$

$$\hbar\omega_2 = E_{F=2,mF=+1}(B_0) - E_{F=2,mF=-1}(B_0) + \hbar\Delta_2$$

$$\Delta_1 = -\Delta_2 = 0.1 \mu_B B_0/2$$

$$\Omega_1 = \Omega_2 = \Omega$$

The normalized microwave power or level of contamination is defined by $\kappa = |\Omega/\Delta_1|$ and varies between 0 and 1 in FIG. 9.

As has been seen, it is possible, with a knowledge of all the parameters of the gravimeter, to determine by calculation the value of the magic field. However, it will be understood that certain parameters are difficult to define with a high precision. Accordingly, the gravimeter according to the invention comprises calibration means allowing a "magic" magnetostatic field to be determined for which the difference in energy between the first internal electronic state and the second internal electronic state is independent, to a first order, of the fluctuations of the magnetostatic field, the calibration means comprising firsts means allowing the magnetostatic field to be made to oscillate around predetermined values in the presence of the microwave fields and seconds means for measuring the variations of difference in energy between the first internal electronic state and the second internal electronic state, the magic field corresponding to the minimum variation of difference in energy.

Based on the theoretical model described previously, the experimenter finds experimentally the optimum value of the magic field and thus calibrates the magnetostatic field. The values of $B_m$ as a function of κ can also be determined. For this purpose, the experimenter performs the Ramsey spectroscopy of the two-photon transition between the states $|1\rangle$ and $|2\rangle$, by measuring with precision the resonance frequency $\nu_{12}$, in a first instance without microwave field in order to determined $B_0$, and then in the presence of a microwave field in order to estimate experimentally $B_m(K)$.

What is claimed is:

1. A matter-wave gravimeter using first, second, and third microwave fields for the measurement of a local gravitational field, comprising:
    an electronic chip comprising a measurement axis, the electronic chip further comprising at least a first central conducting wire and two lateral waveguides disposed symmetrically on either side of the first conducting wire, the first conducting wire having a first current flowing through it, the first lateral waveguide having a first waveguide current flowing therethrough modulated at a first waveguide microwave frequency to generate the second microwave field and the second lateral waveguide having a second waveguide current flowing therethrough modulated at a second waveguide microwave frequency to generate the third microwave field;

a vacuum vessel and an assembly of six laser beams combined with a magnetic field gradient generated by coils external to the vacuum vessel configured to capture and for cool a cloud of ultra-cold atoms;

the first conducting wire configured to generate a magnetostatic field to thereby trap the cloud of atoms;

a first short duration pulse combining the first microwave field and a radiofrequency field generated by the first conducting wire on the electronic chip to thereby transfer the atoms into a superposition with equal weights of a first internal electronic state called state |1> and of a second internal electronic state called state |2>, driving each atom into the resultant state equal to $(|1>+|2>)/\sqrt{2}$;

the second microwave field generated by the first lateral waveguide and/or the third microwave field generated by the second lateral waveguide being configured to separate the atoms into two wave packets during a given period of time under the effect of the second microwave field and/or the third microwave field, the separation into two wave packets resulting in a phase-shift associated with the local gravitational field; the cloud of atoms being positioned, prior to separation, above the first conducting wire, the magnetostatic field generated by the first conducting wire being the "magic" magnetostatic field in which the difference in energy between the first internal electronic state and the second internal electronic state is independent, to a first order, of the fluctuations of the magnetostatic field;

the atoms being recombined by the elimination of the applied microwave fields, the phase shift due to the local gravitational field being converted into a difference of population between the internal states by application of a second pulse of short duration combining a first microwave field and a radiofrequency field generated by the first conducting wire on the electronic chip; and an imaging sensor associated with a quasi-resonant laser beam configured to detect the atomic cloud using the technique of imaging by absorption.

2. The matter-wave gravimeter of claim 1 wherein the magnetostatic field oscillating around predetermined values in the presence of the second microwave field and/or the third microwave field, the gravimeter comprising a spectroscopy instrument for measuring the variations of difference in energy between the first internal electronic state and the second internal electronic state, the magic field corresponding to a minimum variation of difference in energy.

3. The matter-wave gravimeter of claim 1 wherein the atoms are rubidium 87 and the first internal electronic state and the second internal electronic state correspond to the two hyperfine levels of rubidium 87 which are denoted $\{F=2, m_F=+1\}$ and $\{F=1, m_F=-1\}$.

4. The matter-wave gravimeter of claim 3 wherein:

the level $\{F=1, m_F=-1\}$ being coupled to the level $\{F=2, m_F=-1\}$ by the second microwave frequency ($\omega_1$), the level thus obtained being called first cross-coupled level |a>, with this first coupling is associated a first Rabi frequency ($\Omega_1$), proportional to the modulus of the microwave field at the second microwave frequency ($\omega_1$); and the level $\{F=2, m_F=+1\}$ being coupled to the level $\{F=1, m_F=+1\}$ by the third microwave frequency ($\omega_2$), the level thus obtained being called second cross-coupled level |b>, with this second coupling is associated a second Rabi frequency ($\Omega_2$), proportional to the modulus of the microwave field at the third microwave frequency ($\omega_2$).

5. The matter-wave gravimeter of claim 3 wherein the magic magnetostatic field is in the range between 3.23 Gauss and 3.55 Gauss, the magic magnetostatic field increasing in a constant manner with the microwave power of the second microwave field and/or of the third microwave field.

6. The matter-wave gravimeter of claim 5 wherein the separation distance of the atoms into two wave packets is substantially equal to 20 microns.

7. The matter-wave gravimeter of claim 4 wherein the first Rabi frequency is equal to the second Rabi frequency.

8. The matter-wave gravimeter of claim 1 wherein the imaging sensor is a CCD camera.

9. The matter-wave gravimeter of claim 1 wherein the imaging sensor is a photodiode.

* * * * *